United States Patent
Sessions et al.

(10) Patent No.: US 12,414,170 B2
(45) Date of Patent: Sep. 9, 2025

(54) POWER ON PAIRING FOR ELECTRONIC COMPONENTS OF A BICYCLE

(71) Applicant: SRAM, LLC, Chicago, IL (US)

(72) Inventors: Shelby Sessions, Chicago, IL (US); Sage Hahn, Chicago, IL (US); Joachim Veeh, Schweinfurt (DE)

(73) Assignee: SRAM, LLC, Chicago, IL (US)

( * ) Notice: Subject to any disclaimer, the term of this patent is extended or adjusted under 35 U.S.C. 154(b) by 366 days.

(21) Appl. No.: 18/071,872

(22) Filed: Nov. 30, 2022

(65) Prior Publication Data

US 2024/0179767 A1 May 30, 2024

(51) Int. Cl.
*H04W 76/11* (2018.01)
*H04W 4/40* (2018.01)

(52) U.S. Cl.
CPC .............. *H04W 76/11* (2018.02); *H04W 4/40* (2018.02)

(58) Field of Classification Search
CPC ................................. H04W 76/11; H04W 4/40
See application file for complete search history.

(56) References Cited

U.S. PATENT DOCUMENTS

| | | | |
|---|---|---|---|
| 9,966,785 B2 | 5/2018 | Kato et al. | |
| 10,773,769 B2 | 9/2020 | Takeshita | |
| 2005/0029033 A1 | 2/2005 | Rip | |
| 2014/0191705 A1 | 7/2014 | Takao | |
| 2016/0336559 A1 | 11/2016 | White | |
| 2017/0012455 A1 | 1/2017 | Kato | |
| 2017/0021739 A1 | 1/2017 | Tsuji | |
| 2018/0222332 A1 | 8/2018 | Hosaka | |
| 2019/0103754 A1 | 4/2019 | Mali | |
| 2020/0062341 A1 | 2/2020 | Talavasek | |
| 2020/0247502 A1 | 8/2020 | Mitsuyasu | |
| 2021/0016850 A1 | 1/2021 | Bass et al. | |
| 2021/0147032 A1 | 5/2021 | Farrell | |
| 2021/0155315 A1 | 5/2021 | Hahn | |
| 2021/0222770 A1 | 7/2021 | Wesling | |
| 2022/0033032 A1 | 2/2022 | Senoo | |
| 2022/0123581 A1 | 4/2022 | Clarke | |

(Continued)

FOREIGN PATENT DOCUMENTS

| CN | 204587213 U | 8/2015 |
|---|---|---|
| CN | 105947078 | 9/2016 |
| CN | 107776823 | 3/2018 |

(Continued)

*Primary Examiner* — David Bilodeau

(57) ABSTRACT

An electronic component for a bicycle includes a communication interface and a processor in communication with the communication interface. The processor is configured to identify a first power on time. The first power on time identifies a time at which the electronic component was powered on by a power source of the bicycle. The processor is configured to listen for one or more messages after the electronic component is powered on and receive, via the communication interface, a message of the one or more messages. The received message is from another electronic component of the bicycle and identifies a second power on time. The second power on time is for the other electronic component. The processor is configured to compare the second power on time to the first power on time and initiate, based on the comparison, pairing of the other electronic component with the electronic component.

21 Claims, 6 Drawing Sheets

(56) References Cited

U.S. PATENT DOCUMENTS

2022/0233382 A1 7/2022 Williams
2022/0295275 A1* 9/2022 Lee .................... B60L 53/80

FOREIGN PATENT DOCUMENTS

| | | |
|---|---|---|
| CN | 107925262 | 4/2018 |
| CN | 215399137 U | 1/2022 |
| CN | 114394193 | 4/2022 |
| DE | 102016106037 | 10/2017 |
| DE | 102017100722 | 7/2018 |
| DE | 102021104614 | 9/2022 |
| DE | 102022109481 | 10/2022 |
| EP | 1449755 | 8/2004 |
| EP | 3838654 | 6/2021 |
| EP | 3851365 | 7/2021 |
| FR | 3043982 | 5/2017 |
| FR | 3046401 A1 | 7/2017 |
| TW | M515499 U | 1/2016 |
| WO | 2016205974 A1 | 12/2016 |
| WO | 2019149668 A1 | 8/2019 |
| WO | 2021077309 | 4/2021 |
| WO | 2022177436 | 8/2022 |

* cited by examiner

POWER ON PAIRING FOR ELECTRONIC COMPONENTS OF A BICYCLE

BACKGROUND

1. Field of the Disclosure

The present disclosure is generally directed to control of electric components of a bicycle, and more particularly, to pairing of electric components of an electric bicycle.

2. Description of Related Art

A bicycle with a pedal assist electric motor (e.g., an electric bicycle or an e-bike) may include a removeable battery pack. The removable battery pack communicates with a drive unit of the electric bicycle to provide information about the battery pack. For example, the removable battery pack may communicate a state of charge, fault conditions, and a connection status of the battery pack. The electric bicycle may also communicate with the battery pack to determine if the connected battery pack was made by an approved supplier before drawing power from the battery pack. The electric bicycle relies on wired communication networks of the electric bicycle to communicate this information from the electric bicycle to the connected battery pack.

SUMMARY

In one example, an electronic component for a bicycle includes a communication interface and a processor in communication with the communication interface. The processor is configured to identify a first power on time. The first power on time identifies a time at which the electronic component was powered on by a power source of the bicycle. The processor is further configured to listen for one or more messages after the electronic component is powered on and receive, via the communication interface, a message of the one or more messages. The received message is from another electronic component of the bicycle and identifies a second power on time. The second power on time is for the other electronic component. The processor is further configured to compare the second power on time to the first power on time and initiate, based on the comparison, pairing of the other electronic component with the electronic component.

In one example, the communication interface is a wireless communication interface.

In one example, the processor is further configured to start a timer when the electronic component is powered on by the power source of the bicycle. The identification of the time at which the electronic component was powered on by the power source of the bicycle includes identification of the time at which the electronic component was powered on by the power source based on the timer.

In one example, the other electronic component of the bicycle is the power source and the power source is a battery. The second power on time identifies a time at which terminals of the battery were powered on.

In one example, the comparison of the second power on time to the first power on time includes determination of a time difference between the second power on time and the first power on time. The processor is further configured to compare the determined time difference to a predetermined time difference threshold. The initiation, based on the comparison, of the pairing includes initiation of the pairing when, based on the comparison of the determined time difference to the predetermined time difference threshold, the determined time difference is less than the predetermined time difference threshold.

In one example, the electronic component is a drive unit of the bicycle.

In one example, the message is a first message, and the other electronic component is a first other electronic component. The processor is further configured to receive, via the communication interface, a second message of the one or more messages. The received second message is from a second other electronic component of the bicycle and identifies a third power on time. The third power on time is for the second other electronic component. The processor is further configured to compare the third power on time to the first power on time and initiate, based on the comparison of the third power on time to the first power on time, pairing of the second other electronic component with the electronic component.

In one example, wherein the processor is further configured to receive, via the communication interface, a plurality of messages of the one or more messages. The plurality of messages include the message. The processor is further configured to identify a plurality of other electronic components of the bicycle based on the received plurality of messages. The plurality of other electronic components include the other electronic component. The processor is further configured to compare the identified plurality of other electronic components of the bicycle to a previous pairing configuration. The previous pairing configuration identifies a plurality of electronic components previously paired with the electronic component. The processor is further configured to execute an action based on the comparison of the identified plurality of other electronic components of the bicycle to the previous pairing configuration.

In one example, the message is a first message. The comparison of the identified plurality of other electronic components of the bicycle to the previous pairing configuration includes identification of an additional electronic component not included within the previous pairing configuration. The processor is further configured to determine, based on a second message of the plurality of received messages, whether the additional electronic component is a human-machine interface (HMI), and transfer, via the communication interface, pairing information for at least some other electronic components of the plurality of other electronic components when the additional electronic component is the HMI.

In one example, the comparison of the identified plurality of other electronic components of the bicycle to the previous pairing configuration includes identification of a missing electronic component included within the previous pairing configuration. The processor is further configured to identify, based on the plurality of messages, whether a component of the plurality of other electronic components is a replacement for the missing electronic component. The processor is further configured to initiate pairing of the component with the electronic component when the component is the replacement for the missing electronic component and generate a warning when the plurality of other electronic components do not include the replacement for the missing electronic component.

In one example, a power source for a bicycle includes a housing, output terminals supported by the housing, and a sensor supported by the housing. The sensor is configured to detect a matching component on the bicycle. The power source also includes a processor in communication with the sensor. The processor is configured to enable the output terminals after the sensor detects the matching component on the bicycle, such that one or more electronic components of the bicycle are powerable by the power source.

In one example, the processor is further configured to determine an enablement time and initiate, based on the determined enablement time, a pairing of an electronic component of the one or more electronic components with the power source.

In one example, the processor is further configured to receive a power on time from the electronic component and compare the received power on time to the determined enablement time. The initiation, based on the determined enablement time, of the pairing of the electronic component with the power source includes initiation, based on the comparison, of the pairing of the electronic component with the power source.

In one example, the comparison of the received power on time to the determined enablement time includes determination of a time difference between the received power on time and the determined enablement time, and comparison of the determined time difference to a predetermined threshold time difference. The initiation, based on the comparison, of the pairing of the electronic component with the power source includes initiation of the pairing of the electronic component with the power source when, based on the comparison, the determined time difference is less than the predetermined threshold time difference.

In one example, the electronic component is a drive unit of the bicycle, and the drive unit includes the matching component. The processor is further configured to identify an electronic component paired with the drive unit and transmit a pairing request to the electronic component paired with the drive unit.

In one example, the electronic component is a processor of a drive unit of the bicycle, and the drive unit includes the matching component. The enablement of the output terminals includes enablement of the output terminals, such that a voltage at the output terminals is a portion of a discharge voltage of the power source. The processor of the drive unit is powerable by the portion of the discharge voltage of the power source, but the drive unit is not powerable by the portion of the discharge voltage of the power source.

In one example, after the initiation of the pairing of the electronic component with the power source, the processor is further configured to increase the voltage at the output terminals, such that the drive unit is powerable by the power source.

In one example, the sensor includes a reed switch, a Hall effect sensor, a near-field communication (NFC) sensor, or any combination thereof. The matching component includes a magnet, an NFC tag, or a combination thereof.

In one example, the processor being configured to determine the enablement time includes the processor being further configured to start a timer after the sensor detects the matching component on the bicycle and determine the enablement time based on the timer.

In one example, the processor is further configured to receive a signal from the sensor and detect the matching component on the bicycle based on the received signal from the sensor.

In one example, a system for controlling a bicycle includes a power sour e including a housing, output terminals supported by the housing, and a sensor supported by the housing. The sensor is configured to detect a matching component on an electronic component. The power source also includes a first communication interface and a first processor in communication with the sensor and the first communication interface. The first processor is configured to enable the output terminals after the sensor detects the matching component on the electronic component, such that the electronic component is powerable by the power source. The first processor is further configured to identify an enablement time. The enablement time identifies a time at which the output terminals were enabled. The first processor is further configured to transmit, via the first communication interface, a message to the electronic component. The message includes the identified enablement time. The electronic component includes a second communication interface and a second processor in communication with the second communication interface. The second processor is configured to identify a power on time. The power on time identifies a time at which the electronic component was powered on by the power source. The second processor is further configured to listen for one or more messages after the electronic component is powered on. The one or more messages include the message transmitted by the power source. The second processor is further configured to receive, via the second communication interface, the message, compare the identified power on time to the identified enablement time, and initiate, based on the comparison, pairing of the power source with the electronic component.

BRIEF DESCRIPTION OF THE DRAWINGS

Objects, features, and advantages of the present disclosure will become apparent upon reading the following description in conjunction with the drawing figures, in which.

DETAILED DESCRIPTION OF THE DISCLOSURE

Figure 1:
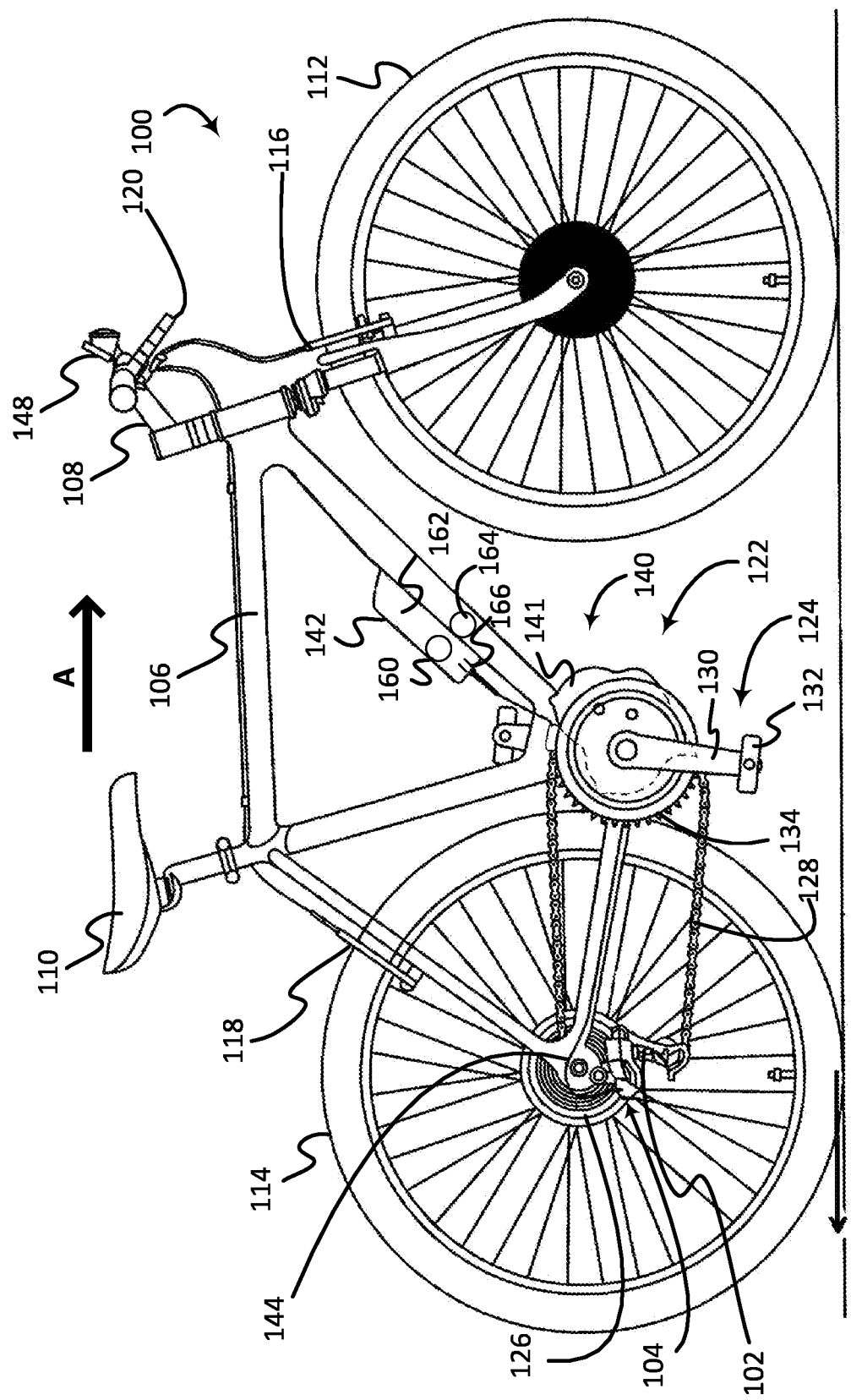
FIG. 1 shows a side view of one example of an electronic bicycle with components that may be paired into a wireless network in accordance with the teachings of this disclosure.

A wireless communication system of an electric bicycle may be used to transmit information and control signals between an electronic component of the electric bicycle and a power source such as a battery pack that is connectable to the electric bicycle. For example, the wireless communication system may run a wireless protocol, via which information and control signals may be transmitted between a drive unit of the electric bicycle and a battery pack. Devices that are to communicate via the wireless communication system are paired together by pressing and holding control buttons on the respective devices to be paired together. Such a control button on the battery pack presents mechanical packaging issues related to placement and sealing. Further, such a pairing procedure is difficult for a user of an electric bicycle who uses a number of different connectable battery packs and/or shares the battery pack with other riders.

The present embodiments use the wireless communication system and the ability of a battery pack to control power to components of the electric bicycle for automatic pairing between one or more of the components and the battery pack. The battery pack includes a sensor (e.g., a reed switch, a Hall-effect sensor, or a near field communication (NFC) tag) that detects a matching component on the electric bicycle (e.g., a magnet or an NFC tag of a drive unit of the electric bicycle). When the sensor of the battery pack detects the matching component, the battery pack enables output terminals of the battery pack and powers one or more components of the electric bicycle. For example, the battery pack enables the output terminals of the battery pack and powers a microcontroller of the electric bicycle.

When the microcontroller of the electric bicycle, for example, is powered on, the microcontroller transmits (e.g., broadcasts) a wireless message that includes an amount of time the microcontroller has been powered on (e.g., a time since power up). The microcontroller continues to transmit the wireless message (e.g., at a predetermined rate), updating the time since power up on each wireless message transmit, until the microcontroller, for example, has been paired to the battery pack.

The battery pack listens for the wireless message and determines a time from when the output terminals were powered on, a time that the wireless message was received from the electric bicycle, and the time since power up included in the wireless message received from the electric bicycle. If all of this information aligns (e.g., the time from when the output terminals of the battery pack were powered on and the time since power up of the microcontroller included in the wireless message), then the battery pack, the microcontroller, an electric assist drive unit, and any other devices previously paired to the electric bicycle (e.g., derailleurs, head units, human-machine interfaces (HMIs), etc.) will complete the pairing process.

In one embodiment, an electronic component for an electric bicycle (e.g., a microcontroller of an electric assist drive unit) includes a communication interface (e.g., a wireless communication interface) and a processor in communication with the communication interface. The processor is configured to identify a first power on time. The first power on time identifies a time at which the electronic component was powered on by a power source of the bicycle. The processor is further configured to listen for one or more messages after the electronic component is powered on and receive, via the communication interface, a message of the one or more messages. The received message is from another electronic component (e.g., a battery) of the bicycle and identifies a second power on time. The second power on time is for the other electronic component (e.g., a time at which power from the battery to the electric assist drive unit is enabled). The processor is further configured to compare the second power on time to the first power on time and initiate, based on the comparison, pairing between the other electronic component and the electronic component.

After the microcontroller has discovered all devices that are connected to the battery pack, the microcontroller then determines if any new pairing actions or error handling is to be provided. If the discovered devices are the same that were previously paired to the system (e.g., a previous pairing configuration) and all previously paired devices are present, then the microcontroller takes no action, and the electric bicycle may operate in a normal state. If a device is missing from the previous pairing configuration, then the microcontroller checks to see if an equivalent replacement device has been discovered. If an equivalent replacement device has been discovered, the microcontroller pairs the equivalent replacement device into the system and may alert the user that a new device has been paired into the system. If a replacement device is not found, and the missing device is critical (e.g., a drive unit), then the HMI or an application running on the HMI or another computing device notifies the user that a replacement device is not found, and the electric bicycle may not operate. If a new device is identified (e.g., via a received wireless message) by the microcontroller, and the new device is an HMI, then the microcontroller transfers the pairing information to the new HMI and prompts the user via the HMI or the application running on the HMI or on the other computing device to repair all non-connected devices (e.g., shifters, seat posts, etc.).

A significant advantage of the disclosed bicycle component control is that pairing of electrical components on a bicycle may be accomplished without user intervention. In other words, the user does not have to go through the traditional pairing process of pressing multiple physical buttons on a number of devices in a specific order, for example, to pair the electrical components on the bicycle. This provides for a better user experience and decreases the time required for the pairing process. This also avoids the mechanical packaging issues related to placement and sealing of a control button on the battery pack. Another advantage is that multiple different battery packs may be used and paired with the electric bicycle without the use of such a control button.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In the case of wireless communication, the components will initially be paired so as to allow secure communication between components on the bicycle without interference from devices not associated with the system. One or more of the components may also be paired with a separate device such as a computer, tablet, or phone (e.g., a mobile computing device). This paired device may provide the user interface to allow the user to communicate with the components on the bicycle. Examples of communication are updating firmware, setting variables, and running diagnostic tools and analysis.

These and other objects, features, and advantages of the disclosed bicycle component control will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 illustrates an example bicycle 100 (e.g., e-bike or electric bicycle) that includes a frame 106, handlebars 108, and a seat 110. The bicycle 100 also includes a first or front wheel 112 and a second or rear wheel 114. A front brake 116 and/or a rear brake 118 are included to brake the front wheel 112 and the rear wheel 114, respectively. The front brake 116 and/or the rear brake 118 are controlled by at least one brake actuator 120. The bicycle 100 includes a drive train 122. The drive train 122 of FIG. 1 includes a crank assembly 124 operatively coupled to a rear cassette 126 via a chain 128. The crank assembly includes crank arms 130 and pedals 132, as well as at least one chainring 134 configured to operatively couple with the chain 128 to transmit force and/or power exerted onto the crank assembly 124 to the chain 128. This force and/or power is transmitted to the rear cassette 126 by the chain 128, whereby a motivating force and/or power is transmitted to the rear wheel 114 from the rear cassette 126. While the drive train 122 includes a gear changer (e.g., a rear derailleur 102 in the illustrated embodiment), other transmissions such as an internal gear hub, a gear box, and/or a continuously variable transmission may be applied to the bicycle 100.

The drive train 122 may also include a power assist device 140. Pedaling torque is applied to the crank assembly 124 by a rider using the pedals 132 and crank arms 130. The power assist device 140 is configured to assist the rotation of the rear wheel 114. In the illustrated embodiment, the power assist device 140 is configured to assist the rotation of the rear wheel 114 via a coupled connection to the crank assembly 124. The power assist device 140 includes a power assist motor 141 that is powered by a remote power source 142.

The chain 128 may be moved between individual sprockets of the rear cassette 126 using the gear changer, such as the rear derailleur 102, as shown in FIG. 1. The rear derailleur 102, for example, is an electric gear changer that is controlled by signals indicating that a shift command has been actuated by the bicycle operator, or rider. The electric rear derailleur 102 may be alternatively powered by an integrated power source or the remote power source 142, using a power conductive connector or cable 144. The power is provided from the remote power source 142 through the cable 144 to an intermediate power connector 104 that is coupled to the rear derailleur 102. The shift commands are implemented using an electric actuator of the user interface 148 that is manually operable by the rider. The signals indicating the shift commands may be communicated to the electric rear derailleur 102 using wired and/or wireless communication techniques.

Figure 2:
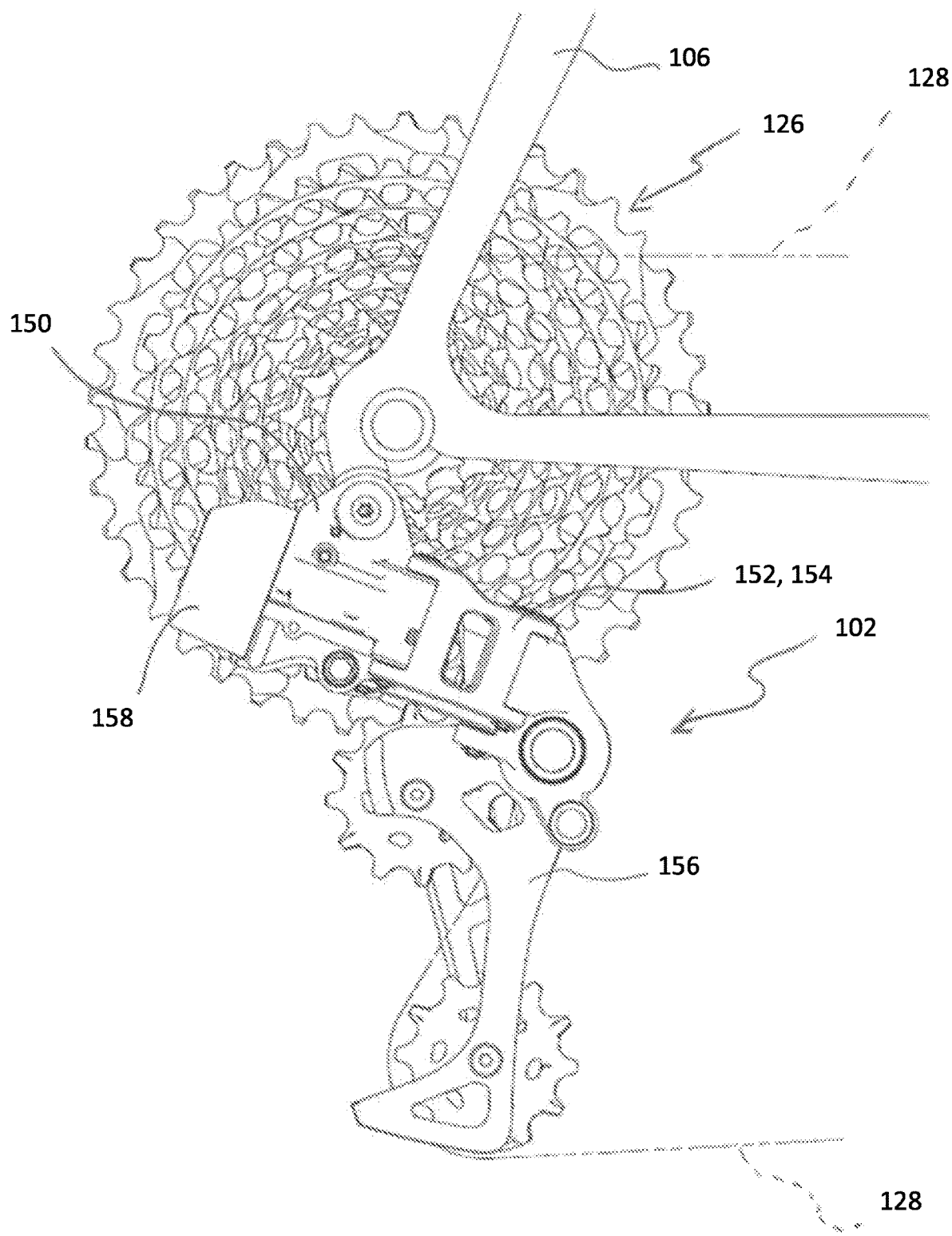
FIG. 2 is a side view of one example of a rear derailleur.

Referring to FIG. 2, the rear derailleur 102 is attached to the bicycle frame 106 and positioned next to the rear cassette 126. The chain 128 is only schematically shown in dashed lines. The electric, or electromechanical, rear derailleur 102 includes a base member 150 (e.g., a "b-knuckle"), an outer link 152, and an inner link 154. The base member 150 is attachable to the bicycle frame 106 in a conventional manner. The inner link 154 is pivotally attached to the base member 150 by link pins, for example. A moveable member or assembly 156 (e.g., a "p-knuckle") is pivotally connected to the outer link 152 and the inner link 154 at an end opposite the base member 150 to permit displacement of the moveable assembly 156 relative to the base member 150.

The rear derailleur 102 may also be configured to work with an integrated power source 158, such as a removable battery. In the examples shown in FIGS. 1 and 2, the integrated power source or battery 158 is attached to the rear derailleur 102. The integrated power source 158 may power, for example, a motor of the rear derailleur 102 used to shift the rear derailleur 102.

As shown in FIG. 1, the handlebar mounted user interface 148 may be a human-machine interface (HMI) and may include one or more buttons (e.g., for pairing and shifting), sensors, a display, a sound generator, one or more processors, memory, one or more communication interfaces (e.g., a wireless communication interface), and/or other components. The user interface 148 may include more, fewer, and/or different components. In one embodiment, the user interface 148 is a head unit.

One, some, or all of the electric components discussed above and/or other electric components may be connected to the remote power source or remote battery 142. Additionally, all communication between an e-bike central control system or controller, and each of these electric components is achieved through wired or wireless communication. There may be discrete control with individual wires from the central controller to each component, or the system may use a controller area network ("CAN") bus designed to allow microcontrollers and devices to communicate with each other in applications.

While the illustrated bicycle 100 is a mountain bicycle and may include suspension components, such as a shock absorbing front fork, the embodiments disclosed herein may be implemented with other types of bicycles such as, for example, road bicycles. The front and/or forward orientation of the bicycle 100 is indicated by the direction of the arrow "A" in FIG. 1. As such, a forward direction of movement of the bicycle is indicated by the direction of the arrow A.

An e-bike central control system or controller may be supported by a same housing as the power assist device 140. The e-bike controller may control power from the remote power source 142 to components on the bicycle 100 such as, for example, the power assist device 140. The e-bike controller may control power to other and/or different components on the bicycle 100. The e-bike controller may send signals (e.g., instructions, pairing information) to and/or receive data (e.g., pairing information, instructions, and/or sensor data) from components on the bicycle 100 such as, for example, the derailleur 102, a suspension system, and/or a seat post assembly to actuate and/or control components of the bicycle 100.

In other embodiments, the e-bike controller may be located in other locations (e.g., mounted on the handlebars as part of the user interface 148) on the bicycle 100 or, alternatively, may be distributed among various components of the bicycle 100, with routing of a communication link to accommodate necessary signal and power paths. In one embodiment, the e-bike controller shares a housing with the remote power source 142. The e-bike controller may also be located in locations other than on the bicycle 100, such as, for example, on a rider's wrist or in a jersey pocket. The communication link may include wires, may be wireless, or may be a combination thereof. In one example, the e-bike controller may be integrated with the rear derailleur 102 to communicate control commands between components. The e-bike controller may include a processor, a communication device (e.g., a wireless communication device), a memory, and one or more communication interfaces.

In one example, the e-bike controller controls pairing of electric components into a wireless network, via which the electric components communicate. Additionally, the controller of the derailleur and/or the e-bike controller wirelessly actuates a motor module of the derailleur 102 and/or an assist motor and operates the derailleur 102 for executing gear changes and gear selection. Additionally or alternatively, the controller of the derailleur and/or the e-bike controller may be configured to control gear shifting of a front gear changer.

The bicycle 100 may include one or more sensors. For example, the one or more sensors may include a wheel speed sensor that is configured to determine a wheel speed based on sensing a sensing element (e.g., a magnet) positioned on, for example, the rear wheel 114 of the bicycle 100. The one or more sensors may also include, for example, an inertial measurement unit (IMU) as part of, for example, the e-bike controller.

The remote power source 142 may include a sensor 160 configured to identify when the remote power source 142 is installed on the bicycle 100 and identify whether the remote power source 142 is an appropriate power source for the bicycle 100. The sensor 160 may be any number of different types of sensors including, for example, a reed switch, a Hall-effect sensor, a near field communication (NFC) tag, another type of sensor, or any combination thereof. The sensor 160 may be supported by a housing 162 of the remote power source 142.

The bicycle 100 (e.g., the frame 106 of the bicycle 100) supports a matching component 164. The sensor 160 is configured to identify the matching component 164 when the remote power source 142 is installed on the bicycle 100, and generate a signal when the matching component 164 is identified. The matching component 164 may be any number of different passive components including, for example, a magnet that may be sensed by a reed switch or a Hall-effect sensor 160, or an NFC tag that may be sensed by another NFC tag operating as the sensor 160. Other combinations of sensor 160 and matching component 164 may be provided.

The remote power source 142 also includes output terminals 166 supported by the housing 162 of the remote power source 142. The remote power source 142 may apply a voltage to one or more components of the bicycle 100 via the output terminals 166 of the remote power source 142. For example, the remote power source 142 may apply a voltage to the power assist device 140 (e.g., the power assist motor 141) via the output terminals 166 of the remote power source 142.

Figure 3:
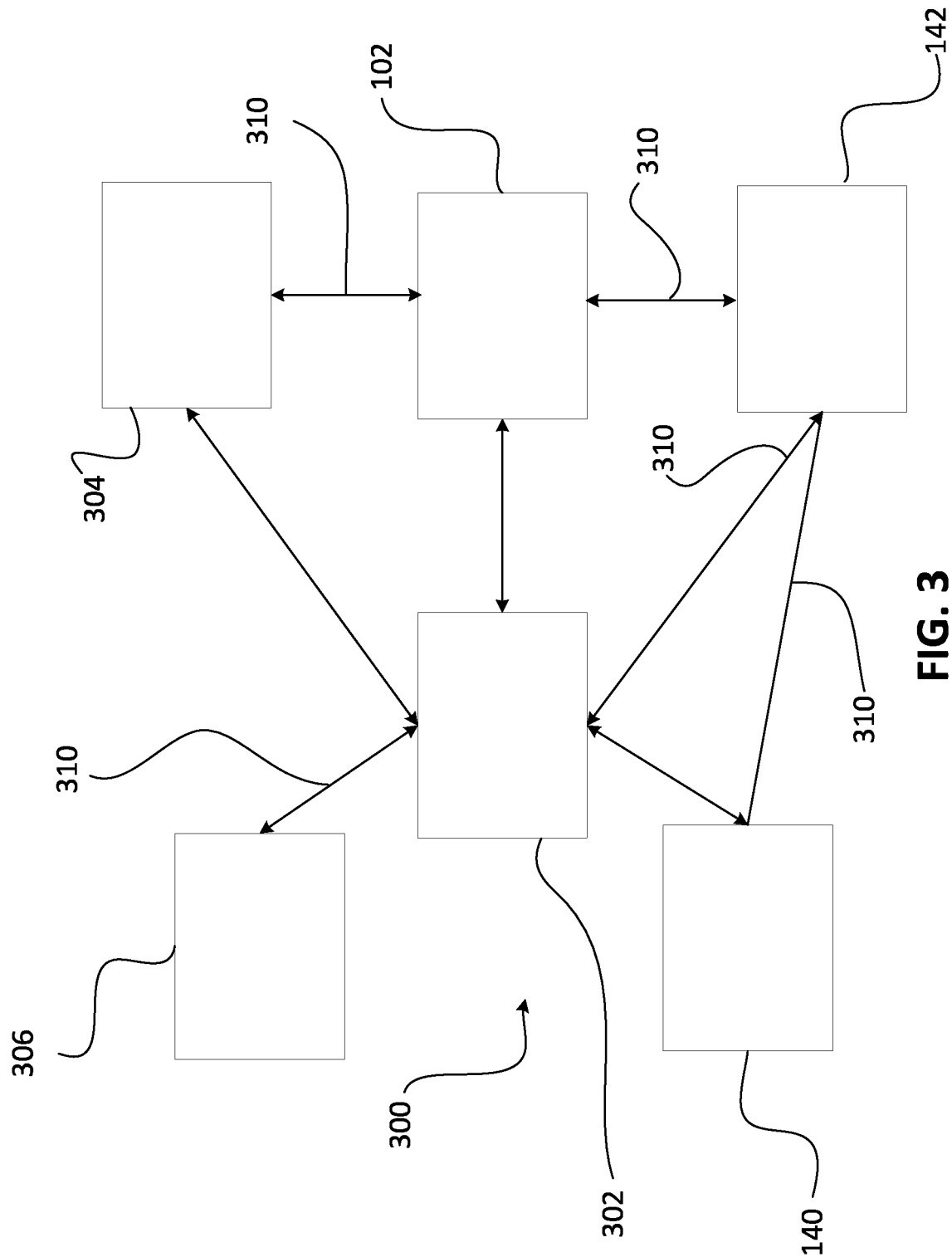
FIG. 3 is a block diagram of an embodiment of an electromechanical control system.

FIG. 3 shows an example of a control system 300 (e.g., an electromechanical control system) for the bicycle 100, for example. The control system 300 includes an e-bike controller 302, the power assist device 140, the remote power source 142, the rear derailleur 102, and one or more sensors. The power assist device 140 includes, for example, an assist motor.

The one or more sensors include, for example, a pedal speed sensor 304 and a wheel speed sensor 306 (e.g., the wheel speed sensor 160). For example, the pedal speed sensor 304 measures a rotational speed of at least one of the crank arms 130, and the wheel speed sensor 306 measures a rotational speed of at least one of the wheels 114, 112. In one embodiment, the one or more sensors may include at least two wheel speed sensors 306, one for the front wheel 112 and one for the rear wheel 114.

As shown in the embodiment of FIG. 3, the power assist device 140, the remote power source 142 (e.g., when installed), the rear derailleur 102, and the one or more sensors (e.g., the pedal speed sensor 304 and the wheel speed sensor 306) may be in direct communication with the e-bike controller 302. Alternatively or additionally, at least some components of the control system 300 may be in indirect communication with the e-bike controller 302. For example, the wheel speed sensor 306 and/or the pedal speed sensor 304 may be in direct communication with the rear derailleur 102 and indirect communication with the with the e-bike controller 302 via the rear derailleur 102. Communication between the components of the control system 300 may be wired communication and/or wireless communication.

Each communication link 310 between the components of the control system 300 may be in both directions. In other words, data flow between components of the control system 300 in direct communication may be in both directions. For example, the remote power source 142 may receive signals from the e-bike controller 302 or the rear derailleur 102 and return information about the remote power source 142 (e.g., charge state) to the e-bike controller 302 or the rear derailleur 102. The communication links 310 may be established after pairing.

Figure 4:
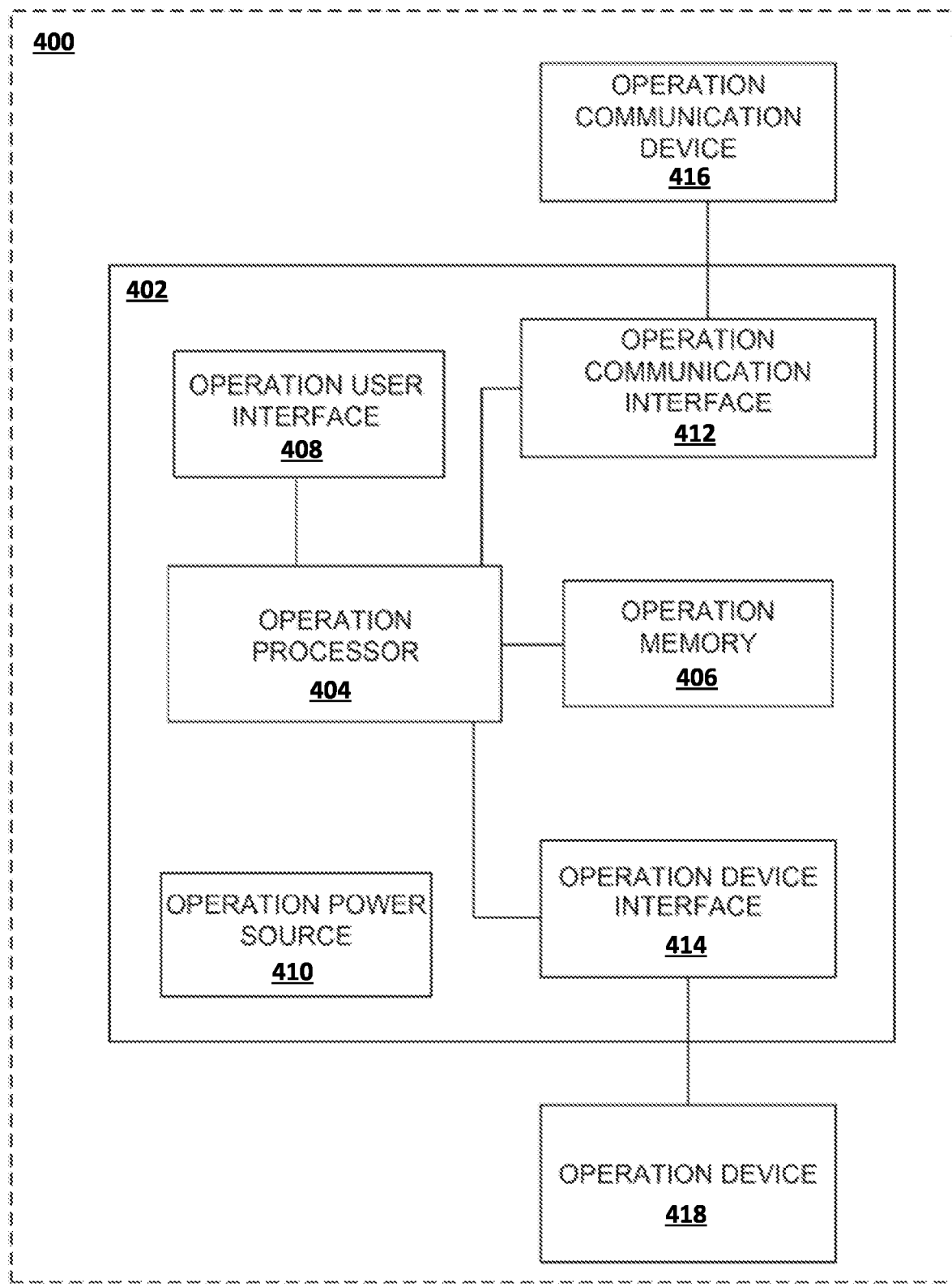
FIG. 4 is a block diagram of an embodiment of an operation component.

FIG. 4 is a block diagram of an operation component 400. The operation component 400 may be or may be part of one or more of the previously described components such as, for example, the rear derailleur 102, the power assist device 140, the remote power source 142, and the e-bike controller 302. The operation component 400 may also be another component, such as an internal gearbox component, a suspension or an adjustable suspension component, or an adjustable seating component. A plurality of operation components 400 may be provided.

The operation component 400 is provided with an operation unit 402, which may be a circuit board or an alternative configuration. The operation unit 402 includes an operation processor 404, an operation memory 406, an operation user interface 408, an operation power source 410, an operation communication interface 412, and an operation device interface 414. In an embodiment, the operation communication interface 412 is in communication with an operation communication device 416, and the operation device interface 414 is in communication with an operation device 418. Additional, different, or fewer components may be provided. For example, the operation user interface 408 may be omitted (e.g., for the remote power source 142).

The structure, connections, and functions of the operation processor 404 may be representative of those of the rear derailleur 102, a front derailleur, the e-bike controller 302, the power assist device 140, the remote power source 142, or another component. The operation processor 404 may include a general processor, digital signal processor, an ASIC, FPGA, analog circuit, digital circuit, combinations thereof, or other now known or later developed processor. The operation processor 404 may be a single device or combinations of devices, such as through shared or parallel processing.

The operation memory 406 may be a volatile memory or a non-volatile memory. The operation memory 406 may include one or more of a ROM, a RAM, a flash memory, an EEPROM, or other type of memory. The operation memory 406 may be removable from the operation component 400, such as an SD memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 406 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding, or carrying a set of instructions for execution by a processor or that cause a computer system to perform any one or more of the methods or operations disclosed herein.

The operation power source 410 is a portable power source, which may be stored internal to the operation component 400 or stored external to the operation component 400 and communicated to the operation component through a power conductive cable. The operation power source 410 may involve the generation of electric power, for example using a mechanical power generator, a fuel cell device, photo-voltaic cells, piezoelectric, or other power-generating devices. The operation power source 410 may include a battery such as a device consisting of two or more electrochemical cells that convert stored chemical energy into electrical energy. The operation power source 410 may include a combination of multiple batteries or other power providing devices. Specially fitted or configured battery types, or standard battery types may be used.

In the example where the operation component 400 is the rear derailleur 102, the operation power source 410 may be stored internal to the operational component 400. In the example where the operation component 400 is the power assist device 140, the operation power source 410 may be stored external to the operation component 400. For example, the power assist device 140 may be powered by the remote power source 142 of FIG. 1.

The operation device interface 414 provides for operation of a component of the bicycle 100. For example, the operation device interface 414 may transmit power from the operation power source 410 to generate movement in the operation device 418. In various embodiments, the operation device interface 414 sends power to control movement of the assist motor 140, a motor of the rear derailleur 102, a motor of the front derailleur, or any combination thereof. In one embodiment, the operation component 400 is the remote power source 142, and the operation device interface 414 sends power to control movement of the power assist device 140. The operation device interface 414 includes wired conductive signals and/or data communication circuitry operable to control the operation device 418.

The operation user interface 408 may be one or more buttons, keypad, keyboard, mouse, stylus pen, trackball, rocker switch, touch pad, voice recognition circuit, or other device or component for communicating data between a user and the operation component 400. The operation user interface 408 may be a touch screen that may be capacitive or resistive. The operation user interface 408 may include an LCD panel, LED, LED screen, TFT screen, or another type of display. The operation user interface 408 may also include audio capabilities or speakers.

The operation communication interface 412 is configured to receive, with the operation communication device 416, data such as pairing information, measurement data (e.g., rotational crank speed, rotational wheel speed, bicycle speed, and/or torque), anticipation signals, operation signals, and/or other signals from bicycle components (e.g., the pedal speed sensor 304, the wheel speed sensor 306, a torque sensor, and/or the e-bike controller 302). In one embodiment, the operation component 400 includes more than one operation communication interface 412 in communication with more than one operation communication device 416, respectively. The operation communication interface 412 may also be configured to send data such as status signals (e.g., charge status signals) for reception by, for example, the e-bike controller 302. The operation communication interface 412 communicates the data using any operable connection. An operable connection may be one in which signals, physical communications, and/or logical communications may be sent and/or received. An operable connection may include a physical interface, an electrical interface, and/or a data interface. One or more operation communication interfaces may provide for wireless communications through the operation communication device 416 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as components of the control system 300 (e.g., the e-bike controller 302, the rear derailleur 102, and the remote power source 142), and/or other components on the bicycle 100 and/or worn by the user. Further, in an exemplary, non-limiting embodiment, implementations may include distributed processing, component/object distributed processing, and parallel processing. Alternatively, virtual computer system processing can be constructed to implement one or more of the methods or functionalities as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media, and memory devices, including by way of example: semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The operation communication device 416 provides for data and/or signal communication from the operation component 400 to another component of the bicycle 100, or an external device such as a mobile phone or other computing device. The operation communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The operation component 400 may include an antenna with circuitry of a PCB of the operation component 400; however, additional antennae may also be included in the circuitry. The control antenna may be integrated with another component of the bicycle 100 or may be an independent component. For example, the control antenna may be integrated as part of the e-bike controller 302, as part of the remote power source 142, and/or as part of the rear derailleur 102.

Figure 5:
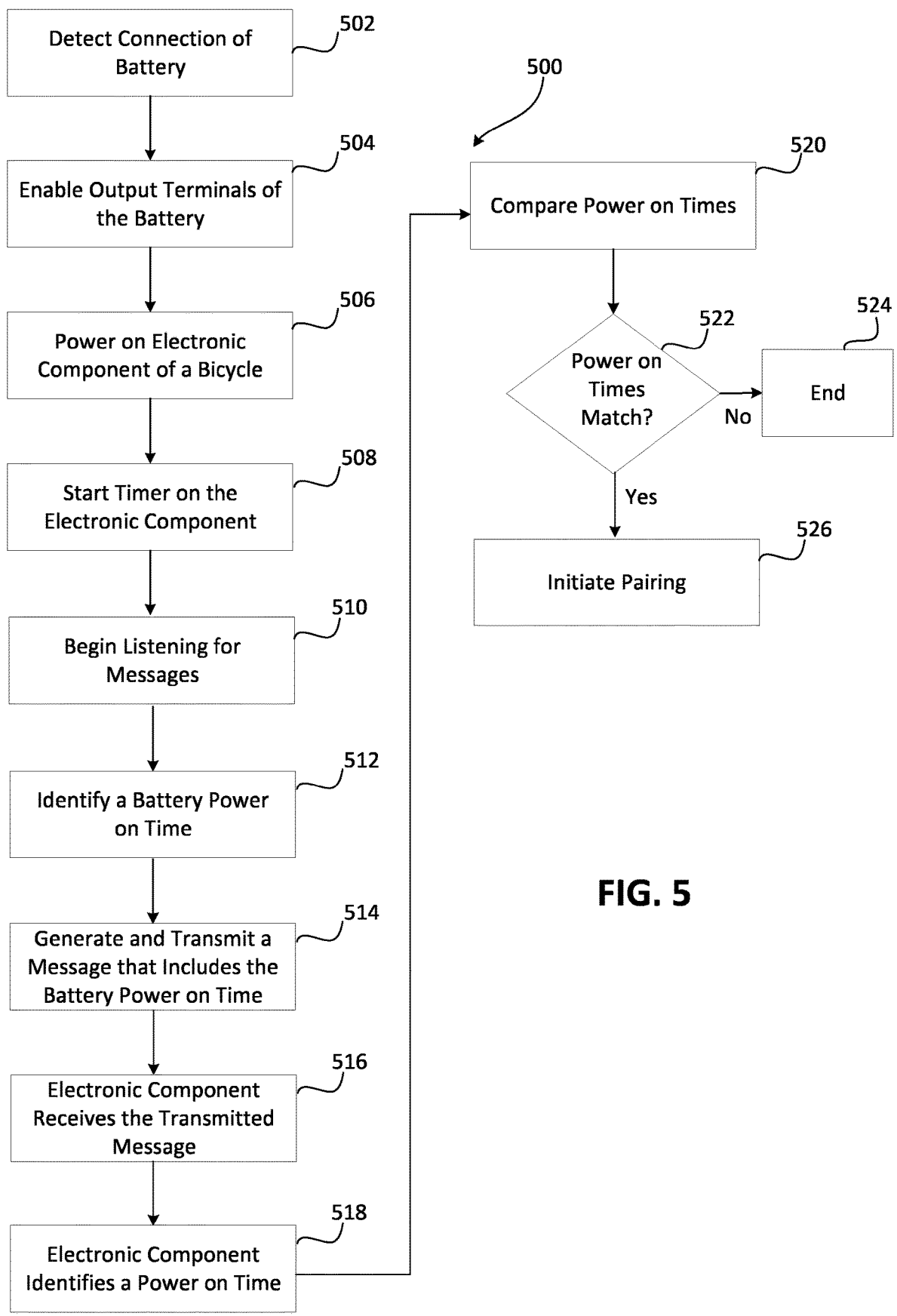
FIG. 5 is a flow chart of an embodiment of a method for pairing electronic bicycle components.

FIG. 5 illustrates a method 500 for pairing one or more components (e.g., electric or electronic components; operations components 400) into a network of a bicycle. For example, the method 500 may be executed to pair a first electronic bicycle component (e.g., the e-bike controller 302) and a second electronic bicycle component (e.g., the remote power source 142) into a network of the bicycle. The acts of the method 500 presented below are intended to be illustrative. In some embodiments, the method 500 may be accomplished with one or more additional acts not described, and/or without one or more of the acts discussed. Additionally, the order in which the acts of the method 500 are illustrated in FIG. 5 and described below is not intended to be limiting.

In some embodiments, the method 500 may be implemented in one or more processing devices (e.g., digital processor, an analog processor, a digital circuit designed to process information, an analog-circuit designed to process information, a state machine, and/or other mechanisms for electronically processing information). The one or more processing devices include one or more devices executing some or all the acts of the method 500 in response to instructions stored electronically on an electronic storage medium. The one or more processing devices are configured through hardware, firmware, and/or software to be specifically designed for execution of one or more of the acts of the method 500. As presented in the following, acts may be performed using any combination of the components indicated in FIGS. 1-4, and/or other components.

In act 502, a processor (e.g., of a power source) detects connection of the power source, in this embodiment, a battery with a bicycle (e.g., the electric bicycle 100 of FIG. 1). For example, the battery includes a sensor in communication with the processor of the battery, and the sensor detects a matching component on or in the bicycle. The battery includes any number of different types of sensors including, for example, a reed switch, a Hall-effect sensor, a near field communication (NFC) tag, or another type of sensor. The bicycle includes any number of matching passive components including, for example, a magnet or a matching NFC tag. The matching component (e.g., a magnet) is positioned on or in the bicycle (e.g., on a frame of the bicycle), such that the sensor of the battery (e.g., the Hall-effect switch) senses the matching component when the battery is installed on the bicycle.

For example, the bicycle may include a battery housing supported by the frame of the bicycle. The battery is installable in the battery housing of the bicycle to initiate both a physical connection and an electrical connection of the battery to the electric bicycle. The battery housing supports the matching component, such that when the battery is installed in the battery housing of the bicycle, the sensor of the battery senses the matching component of the bicycle and thus the connection of the battery with the bicycle.

The processor of the battery may detect connection of the battery with the bicycle in other ways. For example, the processor of the battery may detect a load above a predetermined threshold level and detect the connection of the battery with the bicycle based on the detected load.

In act 504, the processor of the battery enables output terminals of the battery based on the detected connection of the battery with the bicycle in act 502. In one embodiment, the processor of the battery enables the output terminals of the battery, such that the electric bicycle may be powered. In other words, when the processor of the battery enables the output terminals of the battery in act 504, the battery outputs a large enough voltage to power all components of the electric bicycle powerable by the battery (e.g., a drive unit). In another embodiment, the processor of the battery enables the output terminals of the battery, such that a smaller voltage (e.g., 3.3V or 5V) is output. The smaller outputted voltage may be sufficient to power a controller (e.g., a microcontroller) of the electric bicycle (e.g., of a drive unit of the electric bicycle) but not the drive unit itself.

In one embodiment, the battery includes a memory in communication with the processor of the battery. When the processor of the battery enables the output terminals of the battery in act 504, the processor generates a timestamp for a time at which the battery enables the output terminals of the battery in act 504 and stores the timestamp in the memory of the battery. Alternatively or additionally, the processor may start a timer when the battery enables the output terminals of the battery in act 504.

In act 506, an electronic component of the bicycle is powered on in response to the enablement of the output terminals of the battery in act 504. The electronic component may be any number of different components of the bicycle. For example, the electronic component is the controller of the drive unit of the electric bicycle. In one embodiment, the electronic component is the drive unit itself, a derailleur (e.g., a rear derailleur), or a seatpost. The electronic component of the bicycle is powered on via the enabled output terminals of the battery, input terminals of the electric bicycle (e.g., at the battery housing of the electric bicycle), and a wired network on and/or within the electric bicycle.

In act 508, the electronic component (e.g., a processor of the electronic component) starts a timer in response to being powered on in act 506. The timer may be a hardware timer or a software timer. Additionally or alternatively, the electronic component (e.g., the processor of the electronic component) may generate a timestamp corresponding to when the electronic component is powered on in act 506. In one embodiment, the electronic component includes a memory in communication with the processor of the electronic component, and the memory of the electronic component stores the timestamp corresponding to when the electronic component is powered on in act 506. A reading of the timer of the electronic component or the timestamp stored in the memory of the electronic component may represent a first power on time.

In act 510, the electronic component begins listening for messages (e.g., broadcast messages). In one embodiment, both acts 508 and 510 are executed in parallel when the electronic component is powered on in act 506. The electronic component includes a communication interface (e.g., a wireless communication interface; a first communication interface), and the electronic component listens for the messages via the first communication interface. The communication interface of the electronic component may be part of a wireless network that operates according to a communication protocol.

The electronic component may listen for messages for a predetermined amount of time. For example, the electronic component may listen for messages for one second. In other words, the electronic component listening for messages may time out after one second. In other embodiments, the electronic component may listen for messages for a longer period of time or a shorter period of time.

In act 512, the battery (e.g., the processor of the battery) identifies a time at which the battery enabled the output terminals of the battery in act 504. For example, the processor of the battery identifies the timestamp stored in the memory of the battery as the time at which the battery enabled the output terminals of the battery in act 504. In another embodiment, the processor of the battery identifies an elapsed time of a timer running on the battery and determines the time at which the battery enabled the output terminals of the battery in act 504 by subtracting the identified elapsed time from a current time of a clock of the battery. A reading of the timer running on the battery or the timestamp stored in the memory of the battery may represent a second power on time (e.g., a battery enablement time).

In act 514, the battery (e.g., the processor of the battery) generates and transmits (e.g., broadcasts) a message that includes the second power on time. The broadcast message may include other information including, for example, pairing information (e.g., a pairing key) for the battery.

The battery includes a communication interface (e.g., a wireless communication interface; a second communication interface), and the battery transmits the message that includes the second power on time via the second communication interface. The second communication interface (e.g., of the battery) may be part of the wireless network that operates according to the communication protocol.

The generation and transmission of the message by the battery in act 514 may be repeated any number of times. For example, the battery may generate and transmit (e.g., broadcast) a message in act 514 at a predetermined frequency (e.g., every microsecond, every millisecond, every ten milliseconds, or every 100 milliseconds). The messages generated and transmitted in act 514 may each include a same second power on time (e.g., the timestamp stored in the memory of the battery) or may include different power on times (e.g., different elapsed times of the timer running on the battery).

The generation and transmission of the messages in act 514 may be repeated at the predetermined frequency for a predetermined period of time. For example, the predetermined period of time may be two seconds. In other embodiments, different predetermined periods of time may be provided. In other words, the generation and transmission of the messages in act 514 has, for example, a two second timeout.

In act 516, the electronic component, which started listening for messages in act 510, receives the message transmitted by the battery in act 514. The electronic component may receive a number of the messages (e.g., all of the messages) transmitted by the battery in act 514 via the wireless network and the communication interface of the electronic component (e.g., the first communication interface).

In act 518, the electronic component (e.g., the processor of the electronic component) identifies the first power on time. The processor of the electronic component, for example, may identify the first power on time from the timestamp stored in the memory of the electronic component or the timer running on the electronic component. For example, the processor of the electronic component may identify the first power on time based on a reading of the timer running on the electronic component and a current time of a clock of the electronic component (e.g., by subtracting the reading of the timer from the current time of the clock of the electronic component).

In act 520, the electronic component (e.g., the processor of the electronic component) compares the first power on time of the electronic component identified in act 518 to the second power on time of the battery in the message received in act 516. In one embodiment, the processor of the electronic component determines a difference between the first power on time and the second power on time. For example, the processor of the electronic component may subtract the lesser of the first power on time and the second power on time from the greater of the first power on time and the second power on time.

In act 522, the electronic component (e.g., the processor of the electronic component) determines, based on the comparison of act 520, whether the first power on time of the electronic component matches the second power on time of the battery. For example, the processor of the electronic component determines whether the first power on time of the electronic component matches the second power on time of the battery by comparing the determine difference between the first power on time and the second power on time to a predetermined threshold difference. The predetermined threshold difference may be stored in the memory and be any number of lengths of time. For example, the predetermined threshold difference may be 400 milliseconds, though greater or lesser predetermined threshold differences may be used.

If, based on the comparison in act 522, the processor of the electronic component, for example, determines the first power on time of the electronic component does not match the second power on time of the battery, the method 500 moves to act 524 where the method 500 ends. In other words, the electronic component and the battery do not pair. If the processor of the electronic component, for example, determines the first power on time of the electronic component matches the second power on time of the battery (e.g., within 400 milliseconds), the method 500 determines legitimacy of the battery and moves to act 526.

In act 526, the electronic component (e.g., the processor of the electronic component) initiates a pairing between the electronic component and the battery. At act 526, the electronic component has identified one or more electronic components that have matched the filtering criteria of act 522 (e.g., power on times within the predetermined threshold difference) and are available to be paired into the wireless network or another wireless network (e.g., operating according to another communication protocol).

In one embodiment, when the processor of the electronic component, for example, determines the first power on time of the electronic component matches the second power on time of the battery, and the method 500 determines the legitimacy of the battery, the battery may increase a smaller voltage (e.g., 3.3V or 5V) enabled in act 504 (e.g., in response to a request from the electronic component), such that all electronic components of the electric bicycle that are powerable by the battery (e.g., the drive unit) are powered by the battery.

In one embodiment, as part of act 526, the battery sends a pairing request to the electronic component (e.g., the controller of the drive unit or the drive unit), one or more other electronic components that have matched the filtering criteria of act 522, and/or all electronic components currently paired to the electronic component (e.g., as part of a previous pairing configuration). For example, the electronic component may already be paired with a number of other electronic components (e.g., shifters, derailleurs, seat post systems) within the wireless network, and the battery is looking to join the already formed wireless network.

In one embodiment, once the wireless network is formed, including the battery, the battery may start transmitting information about the battery to electronic components (e.g., the controller of the drive unit) in communication with the battery via the wireless network. For example, the battery may start transmitting information about the battery such as, for example, charge level, faults, and/or other information about the battery to any number of electronic components of the bicycle in communication with the battery via the wireless network.

In one embodiment, the method 500 is repeated for other electronic components in, on, or off the bicycle. The method 500 may be performed for the other electronic components in parallel with performance of the method 500 for the battery, as described above. For example, the battery may power at least some of the other electronic components, and acts 512-526 may be performed for these other electronic components in parallel with the performance of acts 512-526 for the battery, as described above. Each electronic component of the bicycle that is powered by the battery may transmit (e.g., broadcast) messages including power on times and pairing information, respectively.

For example, when the battery is connected to the electric bicycle, the battery may power a human-machine interface (HMI). The HMI may be any device that is powerable by the battery and includes a control button. In one embodiment, the HMI is a head unit. In another embodiment, the HMI is a device that includes a radio and a control button supported by a housing. Other HMIs may be provided.

Acts 512-526 may be performed for the HMI in parallel with acts 512-526 being performed for the battery, as described above. For example, for the repeated act 512 for the HMI, a processor of the HMI, for example, identifies a time the HMI was powered on (e.g., a third power on time). The processor of the HMI, for example, identifies the third power on time from a timestamp stored in a memory of the HMI or a timer running on the HMI started when the HMI was powered on by the battery. For the repeated act 520, the processor of the electronic component, for example, compares the first power on time of the electronic component identified in act 518 to the third power on time of the HMI in the message received in repeated act 516. If the third power on time of the HMI matches the first power on time of the electronic component (e.g., within 400 milliseconds), the HMI is included within the one or more components that have matched the filtering criteria of act 522 and are available to be paired into the wireless network or another wireless network. This may be repeated (e.g., in parallel) for any number of the other components that are powered by the battery (e.g., a rear derailleur, a front derailleur, a seat post system).

The battery and other electronic components of the bicycle that are powerable by the battery (e.g., the drive unit and the HMI) may generate and transmit (e.g., broadcast) messages (e.g., including a power on time) to be received by, for example, the electronic component of the bicycle (e.g., acting as a coordinator device) at a same frequency (e.g., every 10 milliseconds) and for a same time period (e.g., two seconds). In another embodiment, some or all of the battery and the other electronic components may generate and transmit messages to be received by, for example, the coordinator device at different frequencies and/or for different time periods. For example, the battery may generate and transmit messages for a time period of two seconds, while the HIM may generate and transmit messages for a time period of one second. The coordinator device (e.g., the electronic component in the method 500 described above)

may listen for messages for a same time period (e.g., two seconds) as the battery and the other electronic components of the bicycle that generate and transmit messages. In another embodiment, the coordinator device listens for messages for a different time period (e.g., one second) compared to the battery and the other electronic components of the bicycle (e.g., two seconds).

In one embodiment, the battery acts as the coordinator device instead of the electronic component of the bicycle, as described above. For example, the battery listens for messages in act 510 and receives the messages in act 516 instead of the electronic component, and the electronic component identifies a power on time in act 512 and generates and transmits (e.g., broadcasts) the messages in act 514 instead of the battery. The messages may include the identified power on time and other information including, for example, pairing information for the electronic component. In such an embodiment, the battery may perform acts 518-526 instead of the electronic component (e.g., the battery identifies the enablement time in act 518 instead of the electronic component identifying a power on time). Other electronic components of the electric bicycle (e.g., the HMI) may act as the coordinator device.

Figure 6:
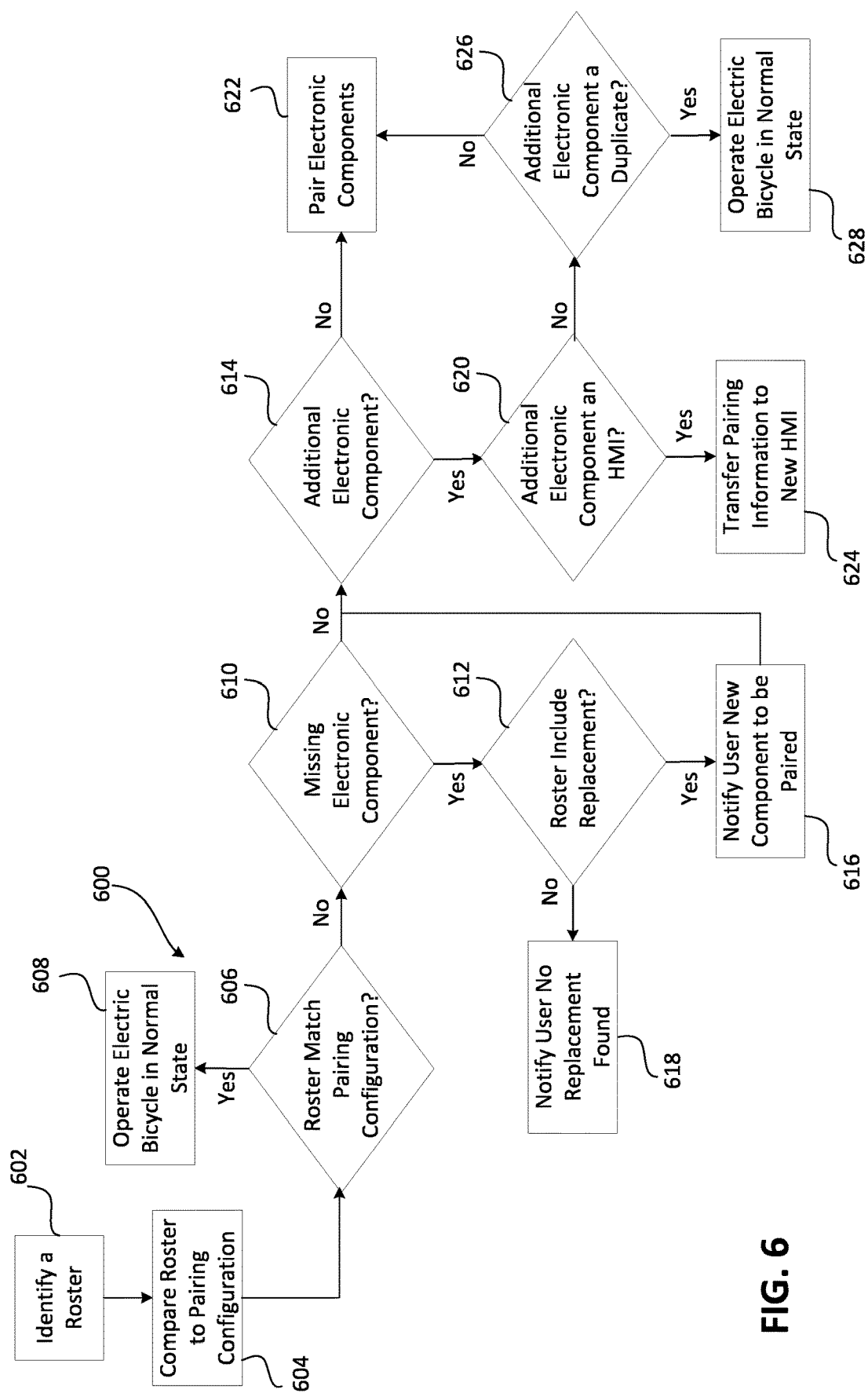
FIG. 6 is a flow chart of another embodiment of a method for pairing electronic bicycle components.

The method 500 may include more, fewer, and/or different acts. For example, the initiating of the pairing in act 526 may include additional acts. FIG. 6 illustrates an example method 600 for pairing electronic components (e.g., operations components 400) into a network of a bicycle based on the components identified as being available to be paired into a wireless network by the method 500, for example, or another method. The acts of the method 600 presented below are intended to be illustrative. In some embodiments, the method 600 may be accomplished with one or more additional acts not described, and/or without one or more of the acts discussed. Additionally, the order in which the acts of the method 600 are illustrated in FIG. 6 and described below is not intended to be limiting.

In some embodiments, the method 600 may be implemented in one or more processing devices (e.g., digital processor, an analog processor, a digital circuit designed to process information, an analog-circuit designed to process information, a state machine, and/or other mechanisms for electronically processing information). The one or more processing devices include one or more devices executing some or all of the acts of the method 600 in response to instructions stored electronically on an electronic storage medium. The one or more processing devices are configured through hardware, firmware, and/or software to be specifically designed for execution of one or more of the acts of the method 600. As presented in the following, acts may be performed using any combination of the components indicated in FIGS. 1-4, and/or other components.

In act 602, a processor of a coordinator device (e.g., an electronic component such as a drive unit) of a bicycle (e.g., an electric bicycle) identifies a roster of electronic components of the bicycle that are available for pairing into a wireless network. The electronic components may include a battery of the electric bicycle and electronic components of the electric bicycle that are powerable by the battery. The roster of the electronic components of the electric bicycle that are available for pairing may be identified as a result of, for example, the method 500 of FIG. 5.

The roster may be stored in a memory of the coordinator device or another memory in communication with the coordinator device. For example, the roster may be a list or a spreadsheet of device identifications (e.g., device IDs) corresponding to the electronic components that are available for pairing (e.g., after the execution of the method 500 of FIG. 5). The device IDs identify types of electronic components that are available for pairing, respectively. In one embodiment, instead of device IDs, the roster may include a list or a spreadsheet of the types of electronic components that are available for pairing.

In act 604, the processor of the coordinator device, for example, compares the roster of electronic components that are available for pairing identified in act 602 to a previous pairing configuration. The previous pairing configuration may identify a plurality of electronic components that were previous paired into the wireless network. In one embodiment, the previous pairing configuration is a roster of electronic components most recently paired into the wireless network. In another embodiment, the previous pairing configuration is a roster of electronic components most often paired into the wireless network. Other previous pairing configurations may be used.

The previous pairing configuration may be stored in the memory of the coordinator device or the other memory, and may be stored in any number of forms. For example, the previous pairing configuration may be a list or a spreadsheet of device IDs corresponding to the electronic components that were previously paired into the wireless network. The device IDs of the previous pairing configuration identify types of electronic components that were previously paired into the wireless network, respectively. In one embodiment, instead of device IDs, the previous pairing configuration may be a list or a spreadsheet of the types of electronic components that were previously paired into the wireless network.

The comparison may be a comparison of device IDs and/or a comparison of component types between, for example, the identified roster and the previous pairing configuration. The processor of the coordinator device, for example, may determine whether all of the electronic components of the identified roster are included within the previous pairing configuration. The processor of the coordinator device may also, for example, determine, based on the comparison, whether the identified roster includes more electronic components than the previous pairing configuration, whether the identified roster includes fewer electronic components than the previous pairing configuration, whether the identified roster includes at least one different electronic component than the previous pairing configuration, and/or whether the identified roster includes more than one of a same type of electronic component.

In act 606, the processor of the coordinator device, for example, determines, based on the comparison of act 604, whether the roster of electronic components that are available for pairing matches the previous pairing configuration. In other words, the processor of the coordinator devices determines whether the electronic components that are available for pairing, as included within the roster, are the same as the electronic components previous paired to the wireless network, as defined by the previous pairing configuration (e.g., all previously paired electronic components are present). If, based on the comparison of act 604, the roster of electronic components that are available for pairing matches the previous pairing configuration, the method moves to act 608. If, based on the comparison of act 604, the roster of electronic components that are available for pairing does not match the previous pairing configuration, the method moves to act 610.

In act 608, the electric bicycle may operate in a normal state (e.g., a state according to the previous pairing configuration), and no action is to be taken by the user. The electronic components identified within the roster may be paired to the wireless network without any user intervention (e.g., based on pairing information previously broadcast by the electronic components identified within the roster, such as in act 514 of the method 500 of FIG. 5).

In act 610, the processor of the coordinator device, for example, determines, based on the comparison of act 604, whether an electronic component from the previous pairing configuration is missing from the roster identified in act 602. In other words, the processor of the coordinator device determines whether an electronic component identified in the previous pairing configuration is not included in the roster identified in act 602. If the processor determines, based on the comparison of act 604, an electronic component is missing, the method 600 moves to act 612. If the processor determines, based on the comparison of act 604, that an electronic component is not missing, the method 600 moves to act 614.

In act 612, the processor of the coordinator device, for example, determines whether the roster identified in act 602 includes a replacement (e.g., an equivalent replacement) for the electronic component from the previous pairing configuration that is missing. For example, the processor identifies any extra electronic components included within the roster but not included within the previous pairing configuration, and compares a component type stored in the roster for the extra electronic component, for example, to the component type stored in the previous pairing configuration for the missing electronic component, for example. If, based on this comparison, the processor of the coordinator device determines the roster includes a replacement for the missing electronic component, the method 600 moves to act 616, and the replacement electronic component included within the roster is not longer identified as a mismatched electronic component (e.g., not identified as an additional electronic component in act 614). If, based on this comparison, the processor of the coordinator device determines the roster does not include a replacement for the missing electronic component, the method 600 moves to act 618. Act 612 may be repeated for each electronic component missing from the previous pairing configuration.

In act 616, the processor of the coordinator device, for example, instructs one of the electronic components of the bicycle (e.g., the HMI) or a mobile computing device in communication with the bicycle (e.g., a mobile phone) to notify the user that a new electronic component (the replacement electronic component) will be paired or has been paired into the wireless network. For example, the mobile phone may run an application, and the processor of the coordinator device instructs the mobile device to notify the user via the application. The notification may be any number of different types of notifications including, for example, a visual notification or an audio notification. After act 616, the method 600 moves to act 614.

In act 618, the processor of the coordinator device, for example, instructs one of the electronic components of the bicycle (e.g., the HMI) or a mobile computing device in communication with the bicycle (e.g., a mobile phone) to notify the user that an electronic component from the previous pairing configuration is missing and no replacement has been found. For example, the mobile phone may run an application, and the processor of the coordinator device instructs the mobile device to notify the user via the application. The notification may be any number of different types of notifications including, for example, a visual notification or an audio notification.

In one embodiment, the electronic components of the identified roster that do match electronic components of the previous pairing configuration pair into the wireless network without user intervention. In another embodiment, none of the electronic components of the identified roster pair into the wireless network due to the missing electronic component identified based on the comparison of act 604.

Depending on the type of electronic component the missing electronic component is, the electric bicycle may not operate. For example, if the missing electronic component is critical to operation of the electric bicycle (e.g., a drive unit is missing), for example, then the electric bicycle will not operate.

In act 614, the processor of the coordinator device, for example, determines, based on the comparison of act 604, whether the roster includes an additional electronic component (e.g., a different electronic component) compared to the previous pairing configuration. In other words, the processor of the coordinator device determines whether an electronic component of the roster identified in act 602 is not included in the previous pairing configuration. If the processor determines, based on the comparison of act 604, the roster includes an additional electronic component, the method 600 moves to act 620. If the processor determines, based on the comparison of act 604, that the roster does not include an additional electronic component, the method 600 moves to act 622. Act 614 may be repeated for each electronic component missing from the previous pairing configuration.

In act 620, the processor of the coordinator device, for example, determines whether the additional electronic component included in the roster is an HMI. For example, the processor of the coordinator device may identify whether the additional electronic component is an HMI based on the component type stored within the roster in the memory of the coordinator device corresponding to the additional electronic component, for example. If the processor determines the additional electronic component is an HMI, the method 600 moves to act 624. If the processor determines the additional electronic component is not an HMI, the method 600 moves to act 626.

In act 624, the processor of the coordinator device, for example, transfers pairing information to the new HMI (e.g., the additional electronic component included within the roster) and instructs one of the electronic components of the bicycle (e.g., the new HMI) or a mobile computing device in communication with the bicycle (e.g., a mobile phone) to notify the user that pairing of all electronic components of the bicycle not powerable by the battery (e.g., non-connected electronic components), for example, will need to be repaired. For example, the mobile phone may run an application, and the processor of the coordinator device instructs the mobile device to notify the user via the application. The notification may be any number of different types of notifications including, for example, a visual notification or an audio notification. The electronic components identified within the roster that match the electronic components of the previous pairing configuration may be paired to the wireless network without any user intervention.

Non-connected electronic components of the bicycle may be paired into the wireless network via the new HMI. While some electronic components on the electric bicycle are electrically connected directly to the battery, a number of electronic components such as, for example, shifters, derailleurs (e.g., the rear derailleur), and the seatpost system may be powered via their own battery. These non-connected electronic components may be paired to the wireless network (e.g., and thus the coordinator device) via the new HMI using a standard pairing process. After the battery has been inserted into the electric bicycle and a power on pairing process (e.g., a combination of the method 500 and the method 600) has been completed, then the user may press and hold a control button on the new HMI to initiate a pairing session for the non-connected electronic components. This manual pairing may only be redone when a new HMI or coordinator device is installed on the electric bicycle.

In act 626, the processor of the coordinator device, for example, determines whether the additional electronic component is a duplicate component. In other words, the processor of the coordinator device determines whether the component type of the additional electronic component stored within the roster matches a component type of any other electronic components stored within the roster. If the processor of the coordinator devices determines the additional electronic component is a duplicate component, the method 600 moves to act 628. If the processor of the coordinator devices determines the additional electronic component is not a duplicate component, the method 600 moves to act 622.

In act 628, the electric bicycle may operate in a normal state (e.g., a state according to the previous pairing configuration), and no action is to be taken by the user. The electronic components identified within the roster may be paired to the wireless network without any user intervention. The processor of the coordinator device, for example, may also instruct one of the electronic components of the bicycle (e.g., the HMI) or a mobile computing device in communication with the bicycle (e.g., a mobile phone) to notify the user (e.g., generate an error message) that multiple electronic components identified in the roster have a same device type. For example, the mobile phone may run an application, and the processor of the coordinator device instructs the mobile device to notify the user via the application. The notification may be any number of different types of notifications including, for example, a visual notification or an audio notification.

In act 622, pairing is completed based on the roster identified in act 602. For example, the wireless network after the pairing includes an additional electronic component. The processor of the coordinator device, for example, may facilitate the pairing of the additional electronic component into the wireless network. Alternatively, the processor of the coordinator device may transmit pairing information for the additional electronic component to another electronic component of the bicycle (e.g., the HMI), and the other electronic component of the bicycle may facilitate the pairing of the additional electronic component into the wireless network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electronic component for a bicycle, the electronic component comprising:
 a communication interface; and
 a processor in communication with the communication interface, the processor being configured to:
  identify a first power on time, the first power on time identifying a time at which the electronic component was powered on by a power source of the bicycle;
  listen for one or more messages after the electronic component is powered on;
  receive, via the communication interface, a message of the one or more messages, the received message being from another electronic component of the bicycle and identifying a second power on time, the second power on time being for the other electronic component;
  compare the second power on time to the first power on time; and
  initiate, based on the comparison, pairing of the other electronic component with the electronic component.

2. The electronic component of claim 1, wherein the communication interface is a wireless communication interface.

3. The electronic component of claim 1, wherein the processor is further configured to start a timer when the electronic component is powered on by the power source of the bicycle, and
 wherein the identification of the time at which the electronic component was powered on by the power source of the bicycle comprises identification of the time at which the electronic component was powered on by the power source based on the timer.

4. The electronic component of claim 1, wherein the other electronic component of the bicycle is the power source, and the power source is a battery, wherein the second power on time identifies a time at which terminals of the battery were powered on.

5. The electronic component of claim 1, wherein the comparison of the second power on time to the first power on time comprises determination of a time difference between the second power on time and the first power on time,
 wherein the processor is further configured to compare the determined time difference to a predetermined time difference threshold, and
 wherein the initiation, based on the comparison, of the pairing comprises initiation of the pairing when, based on the comparison of the determined time difference to the predetermined time difference threshold, the determined time difference is less than the predetermined time difference threshold.

6. The electronic component of claim 1, wherein the electronic component is a electric drive unit of the bicycle.

7. The electronic component of claim 1, wherein the message is a first message, and the other electronic component is a first other electronic component,
 wherein the processor is further configured to:
  receive, via the communication interface, a second message of the one or more messages, the received second message being from a second other electronic component of the bicycle and identifying a third power on time, the third power on time being for the second other electronic component;
  compare the third power on time to the first power on time; and
  initiate, based on the comparison of the third power on time to the first power on time, pairing of the second other electronic component with the electronic component.

8. The electronic component of claim 1, wherein the processor is further configured to:
 receive, via the communication interface, a plurality of messages of the one or more messages, the plurality of messages including the message;
 identify a plurality of other electronic components of the bicycle based on the received plurality of messages, the plurality of other electronic components including the other electronic component;
 compare the identified plurality of other electronic components of the bicycle to a previous pairing configuration, the previous pairing configuration identifying a plurality of electronic components previously paired with the electronic component; and
 execute an action based on the comparison of the identified plurality of other electronic components of the bicycle to the previous pairing configuration.

9. The electronic component of claim 8, wherein the message is a first message,
 wherein the comparison of the identified plurality of other electronic components of the bicycle to the previous pairing configuration comprises identification of an additional electronic component not included within the previous pairing configuration,
 wherein the processor is further configured to:
  determine, based on a second message of the plurality of received messages, whether the additional electronic component is a human-machine interface (HMI); and
  transfer, via the communication interface, pairing information for at least some other electronic components of the plurality of other electronic components when the additional electronic component is the HMI.

10. The electronic component of claim 8, wherein the comparison of the identified plurality of other electronic components of the bicycle to the previous pairing configuration comprises identification of a missing electronic component included within the previous pairing configuration,
 wherein the processor is further configured to:
  identify, based on the plurality of messages, whether a component of the plurality of other electronic components is a replacement for the missing electronic component;
  initiate pairing of the component with the electronic component when the component is the replacement for the missing electronic component; and
  generate a warning when the plurality of other electronic components do not include the replacement for the missing electronic component.

11. A power source for a bicycle, the power source comprising:
 a housing;
 output terminals supported by the housing;
 a sensor supported by the housing, the sensor being configured to detect a matching component on the bicycle; and
 a processor in communication with the sensor, the processor being configured to enable the output terminals after the sensor detects the matching component on the bicycle, such that one or more electronic components of the bicycle are powerable by the power source, the processor configured to determine an enablement time and initiate, based on the determined enablement time, a pairing of an electronic component of the one or more electronic components with the battery.

12. The power source of claim 11, wherein the matching component is a passive component.

13. The power source of claim 11, wherein the processor is further configured to: receive a power on time from the electronic component; and compare the received power on time to the determined enablement time, and wherein the initiation, based on the determined enablement time, of the pairing of the electronic component with the power source comprises initiation, based on the comparison, of the pairing of the electronic component with the power source.

14. The power source of claim 13, wherein the comparison of the received power on time to the determined enablement time comprises:
   determination of a time difference between the received power on time and the determined enablement time; and
   comparison of the determined time difference to a predetermined threshold time difference, and
   wherein the initiation, based on the comparison, of the pairing of the electronic component with the power source comprises initiation of the pairing of the electronic component with the power source when, based on the comparison, the determined time difference is less than the predetermined threshold time difference.

15. The power source of claim 14, wherein the electronic component is a drive unit of the bicycle, and the drive unit includes the matching component, and
   wherein the processor is further configured to:
      identify an electronic component paired with the drive unit; and
      transmit a pairing request to the electronic component paired with the drive unit.

16. The power source of claim 11, wherein the electronic component is a processor of a drive unit of the bicycle, and the drive unit includes the matching component, wherein the enablement of the output terminals comprises enablement of the output terminals, such that a voltage at the output terminals is a portion of a discharge voltage of the power source, and wherein the processor of the drive unit is powerable by the portion of the discharge voltage of the power source, but the drive unit is not powerable by the portion of the discharge voltage of the power source.

17. The power source of claim 16, wherein after the initiation of the pairing of the electronic component with the power source, the processor is further configured to increase the voltage at the output terminals, such that the drive unit is powerable by the power source.

18. The power source of claim 11, wherein the sensor includes a reed switch, a Hall effect sensor, a near-field communication (NFC) sensor, or any combination thereof, and wherein the matching component includes a magnet, an NFC tag, or a combination thereof.

19. The power source of claim 11, wherein the processor being configured to determine the enablement time comprises the processor being further configured to:
   start a timer after the sensor detects the matching component on the bicycle; and
   determine the enablement time based on the timer.

20. The power source of claim 11, wherein the processor is further configured to:
   receive a signal from the sensor; and
   detect the matching component on the bicycle based on the received signal from the sensor.

21. A system for controlling a bicycle, the system comprising:
   a power source comprising:
      a housing;
      output terminals supported by the housing;
      a sensor supported by the housing, the sensor being configured to detect a matching component on an electronic component;
      a first communication interface; and
      a first processor in communication with the sensor and the first communication interface, the first processor being configured to:
         enable the output terminals after the sensor detects the matching component on the electronic component, such that the electronic component is powerable by the power source;
         identify an enablement time, the enablement time identifying a time at which the output terminals were enabled; and
         transmit, via the first communication interface, a message to the electronic component, the message including the identified enablement time; and
   the electronic component comprising:
      a second communication interface; and
      a second processor in communication with the second communication interface, the second processor being configured to:
         identify a power on time, the power on time identifying a time at which the electronic component was powered on by the power source;
         listen for one or more messages after the electronic component is powered on, the one or more messages including the message transmitted by the power source;
         receive, via the second communication interface, the message;
         compare the identified power on time to the identified enablement time; and
         initiate, based on the comparison, pairing of the power source with the electronic component.

* * * * *